United States Patent
Manchanda et al.

(10) Patent No.: US 10,356,709 B1
(45) Date of Patent: Jul. 16, 2019

(54) SYSTEMS AND METHODS FOR SELECTING A DONOR FOR A RELAY WIRELESS DEVICE BASED ON FEEDBACK

(71) Applicant: Sprint Spectrum LP, Overland Park, KS (US)

(72) Inventors: Nitesh Manchanda, Overland Park, KS (US); Vanil Parihar, Overland Park, KS (US); Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/643,616

(22) Filed: Jul. 7, 2017

(51) Int. Cl.
| | |
|---|---|
| *H04W 40/22* | (2009.01) |
| *H04W 48/16* | (2009.01) |
| *H04W 48/20* | (2009.01) |
| *H04W 52/36* | (2009.01) |
| *H04W 88/04* | (2009.01) |

(52) U.S. Cl.
CPC ........... *H04W 48/20* (2013.01); *H04W 40/22* (2013.01); *H04W 48/16* (2013.01); *H04W 52/365* (2013.01); *H04W 88/04* (2013.01)

(58) Field of Classification Search
CPC ..... H04W 48/20; H04W 40/22; H04W 48/16; H04W 52/365; H04W 88/04; H04W 52/146; H04W 52/343; H04W 52/46; H04W 36/36; H04W 36/0083; H04W 36/08; H04W 36/30
See application file for complete search history.

(56) References Cited

U.S. PATENT DOCUMENTS

| | | | |
|---|---|---|---|
| 2006/0140117 A1* | 6/2006 | Aerrabotu | H04W 36/26 370/232 |
| 2012/0322494 A1* | 12/2012 | Zhou | H04W 36/30 455/522 |
| 2014/0016537 A1 | 1/2014 | Khobare et al. | |
| 2016/0198418 A1* | 7/2016 | Ishikura | H04W 52/143 455/522 |
| 2017/0180024 A1* | 6/2017 | Kurth | H04B 7/061 |
| 2018/0124677 A1* | 5/2018 | He | H04W 40/12 |

* cited by examiner

*Primary Examiner* — George Eng
*Assistant Examiner* — Umair Ahsan (57) ABSTRACT

Exemplary embodiments described herein include systems, methods, and nodes for selecting a donor for a relay wireless device using feedback. Signals may be scanned for at a relay wireless device to determine potential donor access nodes. The relay wireless device may communicate with the potential donor access nodes such that a power head room report is generated for each potential donor access node. A donor access node may be selected from among the potential donor access nodes based on the generated power head room reports. Backhaul data may be communicated between the relay wireless device with the selected donor access node.

18 Claims, 8 Drawing Sheets

SYSTEMS AND METHODS FOR SELECTING A DONOR FOR A RELAY WIRELESS DEVICE BASED ON FEEDBACK

TECHNICAL BACKGROUND

As wireless networks evolve and grow, there are ongoing challenges in providing high-quality service to increasing numbers of wireless devices or user equipment (UE) in various coverage areas of a wireless network. One approach to improving service quality and coverage is to designate a wireless device as a relay node or relay UE for relaying communication between a base station or access node (donor access node), and an end-user wireless device. Relay wireless devices may be used at the edge of a coverage area of an access node to improve coverage and/or service, as well as in crowded areas having a high number of other wireless devices to increase the available throughput to the end-user wireless devices being relayed. However, end-user wireless device performance can be dependent on the quality of the connection between the relay wireless device and the donor access node. Because of this dependency, donor selection is an important consideration for a relay wireless device configuration. Accordingly, efficiency in donor selection for a relay wireless device may increase quality of service for users of the communication network.

OVERVIEW

Exemplary embodiments described herein include systems, methods, and nodes for selecting a donor for a relay wireless device using feedback. Signals may be scanned for at a relay wireless device to determine potential donor access nodes. The relay wireless device may communicate with the potential donor access nodes such that a power head room report is generated for each potential donor access node. A donor access node may be selected from among the potential donor access nodes based on the generated power head room reports. Backhaul data may be communicated between the relay wireless device with the selected donor access node.

DETAILED DESCRIPTION

In an embodiment, methods and system are described for selecting a donor for a relay wireless device based on feedback. For example, a relay wireless device may connect a small cell to an access node such that the relay wireless device relays backhaul traffic to and from the access node and small cell. In some circumstances, a relay wireless device may have a plurality of options when selecting a donor access node, for example to carry backhaul data between a small cell and the core network. In this example, the quality for communication between the relay wireless device and the selected donor access node can impact quality of service for end-user wireless devices serviced by the small cell.

In some embodiment, uplink communication between the relay wireless device and the selected donor access node may impact such quality of service at least because wireless backhaul communication may include uplink control information that relies on a reliable and/or quality uplink channel between the relay wireless devices and its donor access node. Accordingly, donor selection that considers the uplink channel between a relay wireless device and its potential donor access node may provide benefits to users of the system.

Figure 1:
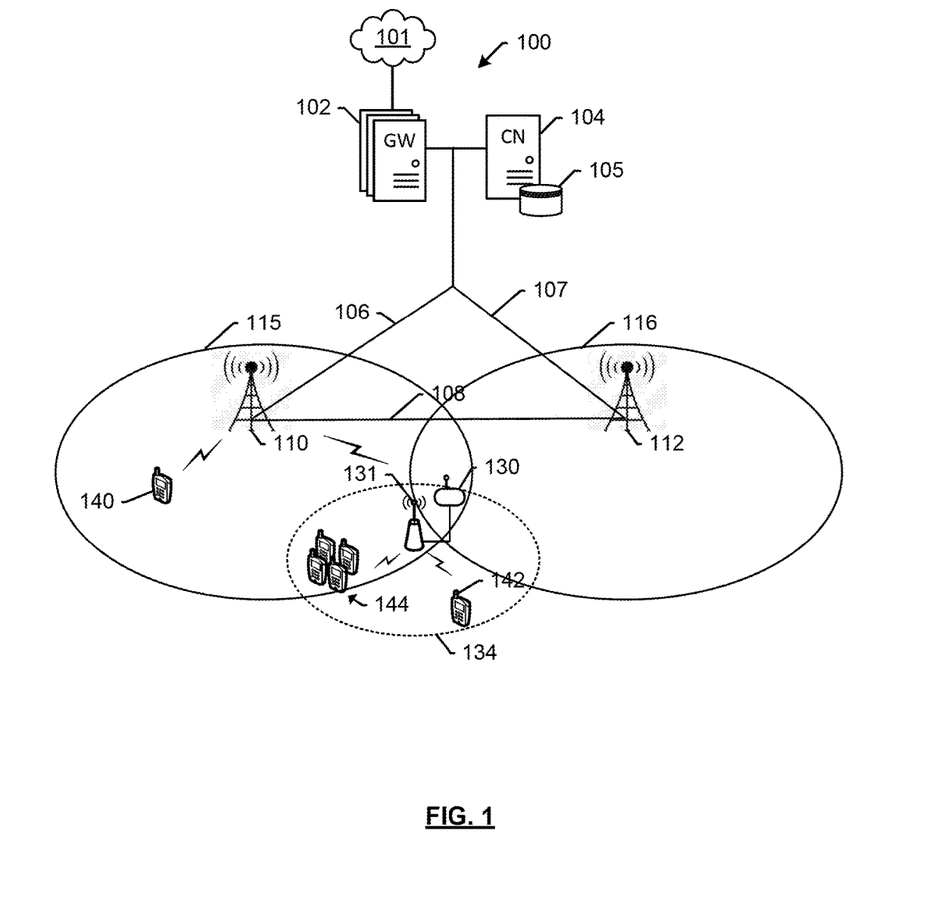
FIG. 1 depicts an exemplary system for selecting a donor for a relay wireless device based on feedback.

FIG. 1 depicts an exemplary system 100 for selecting a donor for a relay wireless device based on feedback. System 100 comprises a communication network 101, gateway nodes 102, controller node 104, access nodes 110 and 112, relay wireless device 130, small cell 131, and wireless devices 140, 142, and 144, which may comprise end-user wireless devices. In an embodiment, access node 110 provides services to wireless devices 142 and 144 via a relay access node that comprises a combination of relay wireless device 130 and small cell 131, which may comprise a relay access point or node. Consequently, access nodes 110 may be referred to as donor access nodes. Relay wireless device 130 is thus configured to relay services from access node 110 to wireless devices 142 and 144.

Access node 110 is illustrated as having coverage area 115, access node 112 is illustrated as having coverage area 116, and small cell 131 is illustrated as having coverage area 134. Wireless devices 140 and 144 are located within coverage area 115, wireless devices 142 and 144 are located within coverage area 134, and small cell 131 is located within coverage areas 115 and 116. In an embodiment, based on the coverage areas for the access nodes which overlap relay wireless device 130, access node 110 and access node 112 may comprise potential donor access nodes for relay wireless device 130 and small cell 131. In an embodiment, cluster of wireless devices 144 may access network services using the combination of relay wireless device 130 and small cell 131, rather than overload access node 110, which may be serving numerous other devices, such as wireless device 140. Moreover, wireless device 142 that is outside coverage area 115 may access network services from access node 110 by virtue of being connected to relay wireless device 130 via small cell 131.

In an embodiment, to achieve this, relay wireless device 130 may comprise a customer premise equipment (CPE), which may be any stationary LTE wireless device having a stronger computational & RF capability versus standard wireless devices, as well as a directional antenna and a dedicated power supply. Relay wireless device 130 also may be communicatively coupled to small cell 131. Small cell 131 may include a mini-macro, picocell, femtocell, or the like that are capable of providing a wireless access point for wireless devices 142 and 144, of which wireless device 144 comprises a cluster of wireless devices.

In an embodiment, relay wireless device 130 can be configured to function as one or more of a layer 1 (L1), layer 2 (L2), or layer 3 (L3) relay. A layer 1 relay functions as a booster or repeater. In other words, a layer 1 relay device performs an amplify and forward (AF) function. RF signals received from access nodes 110 and/or 112 are amplified and transmitted by relay wireless device 130 to one or more of wireless devices 142 and 144. Likewise, RF signals received from wireless devices 142 and 144 are amplified and transmitted by relay wireless device 130, to either access node 110 or access node 112. Alternatively or in addition, a layer 2 relay device performs a decode and forward (DF) function. RF signals received from access node 110 or 112 are demodulated and decoded, then encoded and modulated again before being transmitted by relay wireless device 130 to one or more of wireless devices 142 and 144. Likewise, RF signals received from one or more of wireless devices 142 and 144 are demodulated and decoded, then encoded and modulated again before being transmitted by relay wireless device 130 to access node 110 or 112. Alternatively or in addition, a layer 3 relay device also performs a decode and forward function. However, a layer 3 relay device also performs additional processing (such as ciphering and/or data concatenation/segmentation/resassembly). In other words, relay wireless device 130 may perform demodulation and decoding of the received RF signals (either uplink or downlink), processing of the received data, then encode, modulate, and transmit the data to one or more of wireless devices 142 and 144.

Relay wireless device 130 and wireless devices 140, 142 and 144, may be any device, system, combination of devices, or other such communication platform capable of communicating wirelessly with access node 110 using one or more frequency bands deployed by access node 110. Relay wireless devices 130 and wireless devices 140, 142 and 144 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible. In some embodiments, relay wireless device 130 includes stronger computational & radiofrequency capabilities than an average wireless device, as well as a directional antenna, and dedicated power supply, so that they can sustain an over-the-air backhaul link for wireless devices 142 and 144 that attach to small cell 131.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by relay wireless device 130, and wireless devices 140, 142, and 144. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107, and 108 can use various communication media, such as air, space, metal, optical fiber, or some other signal propagation path-including combinations thereof. Communication links 106, 107, and 108 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Communication links 106 and 107 may include S1 communications links and communication link 108 may comprise an X2 communication link. Other wireless protocols can also be used. Communication links 106, 107, and 108 can be a direct link or might include various equipment, intermediate components, systems, and networks. Communication links 106, 107, and 108 may comprise many different signals sharing the same link Gateway nodes 102 can be any network node or plurality of network nodes that are configured to interface with other network nodes using various protocols. Gateway nodes 102 can communicate user data over system 100. Gateway nodes 102 can be standalone computing devices, computing systems, or network components, and can be accessible, for example, by a wired or wireless connection, or through an indirect connection such as through a computer network or communication network. For example, gateway nodes 102 can include a serving gateway (S-GW) and/or a public data network gateway (P-GW), etc. Gateway nodes 102 can include a relay S-GW/P-DW combination for providing gateway services to relay wireless device 130, as well as a UE S-GW/P-DW combination for providing gateway services to one or more of wireless devices 140, 142, and 144. In embodiments, data packets such as voice over IP (VoIP) data packets may be routed from one or more of relay wireless device 130, and wireless devices 140, 142, and 144 to a relay S-GW/P-GW first, and then to a UE S-GW/P-GW. However, persons having ordinary skill in the art would recognize that gateway nodes 102 are not limited to any specific technology architecture, such as Long Term Evolution (LTE), and can be used with any network architecture and/or protocol.

Each of gateway nodes 102 can comprise a processor and associated circuitry to execute or direct the execution of computer-readable instructions to obtain information. Gateway nodes 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway nodes 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing access node characteristics. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Access nodes 110 and 112 can be any network node configured to provide communication between relay wireless device 130, and wireless devices 140, 142, and 144, and communication network 101. Access nodes 110 and 112 can be a macrocell access node such as a base transceiver station, a radio base station, an eNodeB device, or the like. In an exemplary embodiment, a macrocell access node can have a coverage area 115 or 116 in the range of approximately five kilometers to thirty five kilometers and an output power in the tens of watts. In some embodiments, access nodes 110 and 112 may comprise coverage areas 115 and 116 that are smaller than five kilometers.

Small cell 131 may comprise a small access node, microcell access node, a picocell access node, a femtocell access node, or the like such as a home NodeB or a home eNodeB device. A coverage area for a small cell may be smaller than the coverage area for a macro cell (e.g., access node 110). Moreover, it is noted that while access nodes 110 and 112, and small cell 131 are illustrated in FIG. 1, any number of access nodes and/or small cells can be implemented within system 100.

Access node 110 and 112 and small cell 131 can comprise a processor and associated circuitry to execute or direct the execution of computer-readable instructions to obtain information. Access node 110 and 112 and small cell 131 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access node 110 and 112 and small cell 131 can receive instructions and other input at a user interface. Access node 110 communicates with gateway nodes 102 and controller node 104 via communication link 106, access node 112 communicates with gateway nodes 102 and controller node 104 via communication link 107, and access node 110 communications with access node 112 over communication link 108. Operations performed by one or all of access node 110 and 112, small cell 131, and/or relay wireless device 130 are further described herein with reference to FIGS. 4, 6, and 7.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
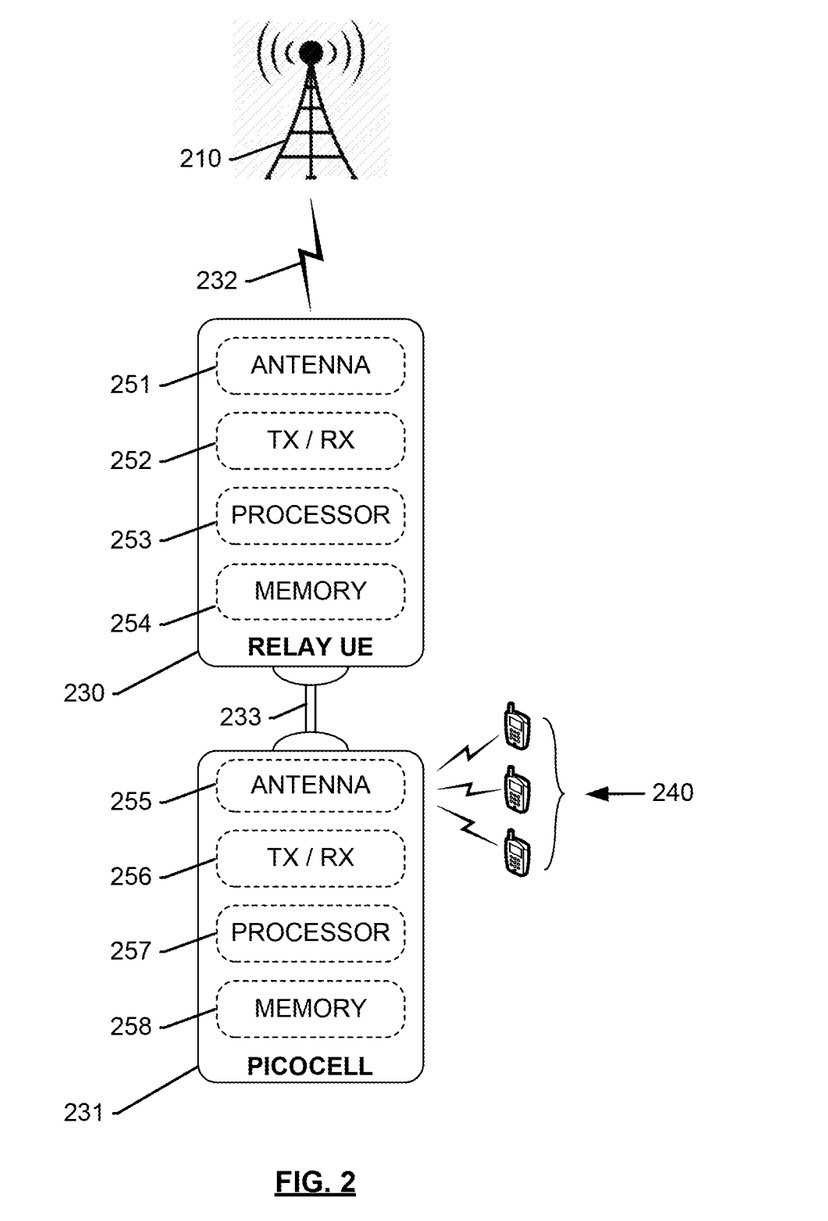
FIG. 2 depicts an exemplary relay wireless device based on feedback.

FIG. 2 depicts an exemplary relay wireless device 230, or relay user equipment (UE), coupled to a small cell 231, or picocell. Relay wireless device 230 is illustrated as comprising an antenna 251 for direct (e.g., unrelayed) communication with access node 210 via communication link 232, a transceiver 252, a processor 253, and a memory 254 for storing instructions that enable relay wireless device 230 to perform operations described herein. In some embodiments, relay wireless device 230 is referred to as a customer premise equipment (CPE), which includes any stationary LTE wireless device having a stronger computational & RF capability versus standard wireless devices, as well as a directional antenna and a dedicated power supply, enabling relay wireless device 230 to efficiently provide resources to wireless devices 240 via small cell 231. Consequently, small cell 231 may be co-located with relay wireless device 230, and is connected to relay wireless device 230 via a communication interface 233. Communication interface 233 may be any interface that enables direct communication between relay wireless device 230 and small cell 231, such as USB, FireWire, Ethernet, or any other serial, parallel, analog, or digital interface. Small cell 231 is illustrated as comprising an antenna 255 for wireless communication with wireless device 240, a transceiver 256, a processor 257, and a memory 258 for storing instructions that enable small cell 231 to perform operations described herein. In some embodiments, small cell 231 may be a Home eNodeB. Moreover, although only one transceiver is depicted in each of relay wireless device 230 and small cell 231, additional transceivers may be incorporated in order to facilitate communication across interface 233 and other network elements.

In operation, relay wireless device 230 relays network services from access node 210 to wireless devices 240 (e.g., end-user wireless device) via small cell 231. Relay wireless device 230 may begin to function as a relay by sending a message to access node 210 to indicate to access node 210 that relay wireless device 230 is functioning as a relay. Access node 210 may consequently alter how relay wireless device 230 is assigned resources. In some embodiments, relay wireless device 230 can request to send a buffer status report to access node 210. Access node 210 can grant this request in a conventional manner. Relay wireless device 230 may respond to the grant by sending a short buffer status report. This short buffer status report may be associated with a logical channel group that indicates the buffer status report is communicating the status of the UE as a relay, and thus is not asking for additional resource allocations (like a 'conventional' buffer status report would indicate). In other words, in some embodiments, when a UE responds with a buffer status report for a predetermined logical channel group, it indicates that the UE is functioning as a relay rather than serving as a conventional buffer status report. Once status of relay wireless device 230 is established, relay wireless device 230 may instruct small cell 231 to start accepting connection requests from one or more of wireless devices 240.

Figure 3:
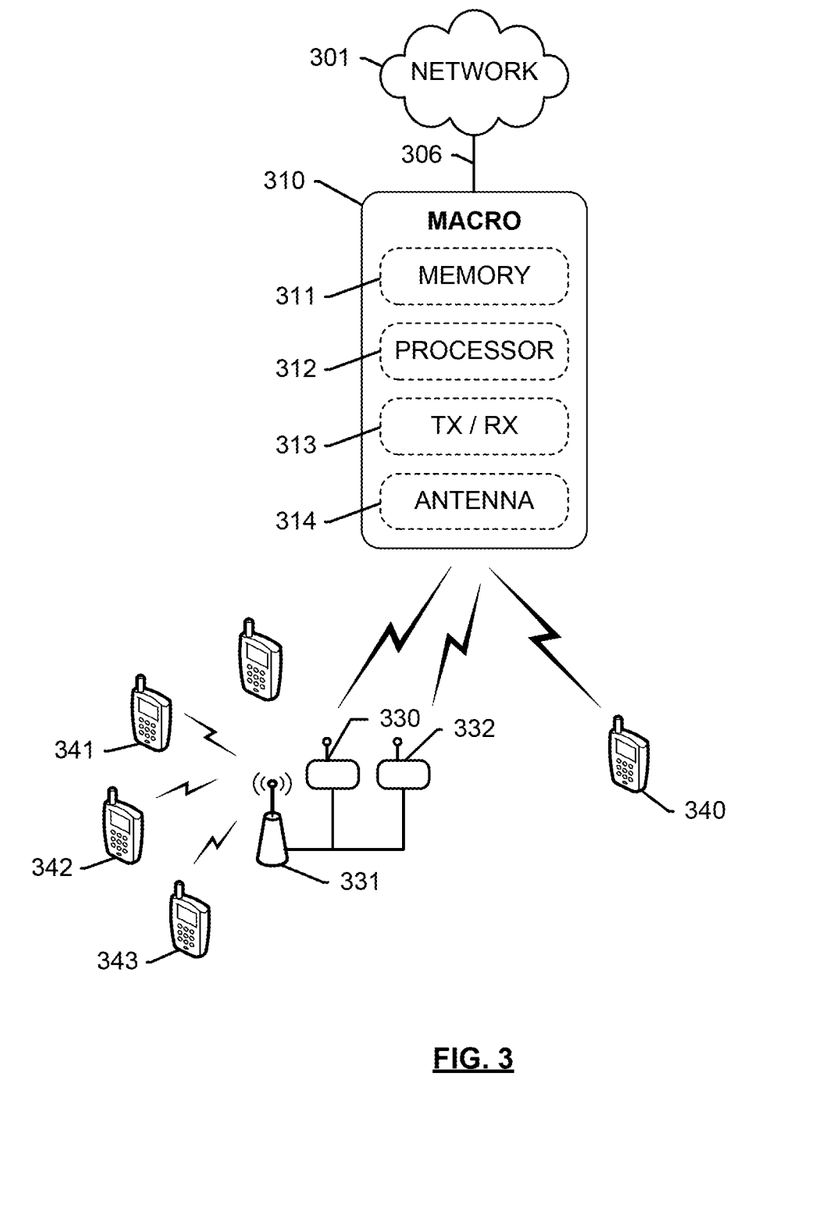
FIG. 3 depicts an exemplary access node.

FIG. 3 depicts an exemplary access node 310 which may comprise, for example, a macro access node. As described herein, access node 310 provides access to network services from network 301 to wireless devices 340, 341, 342, 343, which may comprise end-user wireless devices, either directly, or via relay wireless device 330 and small cell 331. In this embodiment, access node 310 is illustrated as being in communication with network 301 via communication link 306, and comprising a memory 311 for storing instructions that enable access node 310 to perform operations described herein. Further, access node 310 comprises a processor 312 for executing operations, and a transceiver 313 coupled to an antenna 314 for wireless communication with one or more wireless devices, such as wireless device 340, or relay wireless device 330. Further, communication link 306 may be any interface that enables communication between access node 310 and network 301, such as an Si interface. In some embodiments, access node 310 may be in communication with multiple relay wireless devices connected to small cell 331, such as one or both of relay wireless devices 330 and 332. Here, access node 310 provides access to network services from network 301 to wireless devices 340, 341, 342, 343, via relay wireless devices 330 and 332, and small cell 331. Other network nodes such as gateways and controllers may be present but are not shown for purposes of simplicity.

Referring back to FIG. 1, in operation, system 100 may use a plurality of carriers in order to provide wireless communication services. For example, a plurality of carriers that comprise bandwidth for wireless communications (e.g., one or more carriers over a 1.25 GHz spectrum, one or more carriers over a 1900 Mhz spectrum, one or more carriers over a 800 Mhz spectrum, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

As illustrated, relay wireless devices may overlap with coverage areas 115 and 116 of access nodes 110 and 112, such as relay wireless device 130. Accordingly relay wireless device 130 may have a plurality of options when selecting a donor access node, for example to carry backhaul data between small cell 131 and a core network. In this example, small cell 131 may service wireless devices 142 and 144, which may comprise end-user wireless devices. Accordingly, the quality for communication between relay wireless device 130 and the selected donor access node can impact quality of service for the end-user wireless devices serviced by small cell 131. In some embodiment, uplink communication between relay wireless device 131 and the selected donor access node may impact such quality of service at least because wireless backhaul communication may include uplink control information that relies on a reliable and/or quality uplink channel between the relay wireless devices and its donor access node. Accordingly, donor selection that considers the uplink channel between a relay wireless device and its potential donor access node may provide benefits to users of the system.

Figure 4:
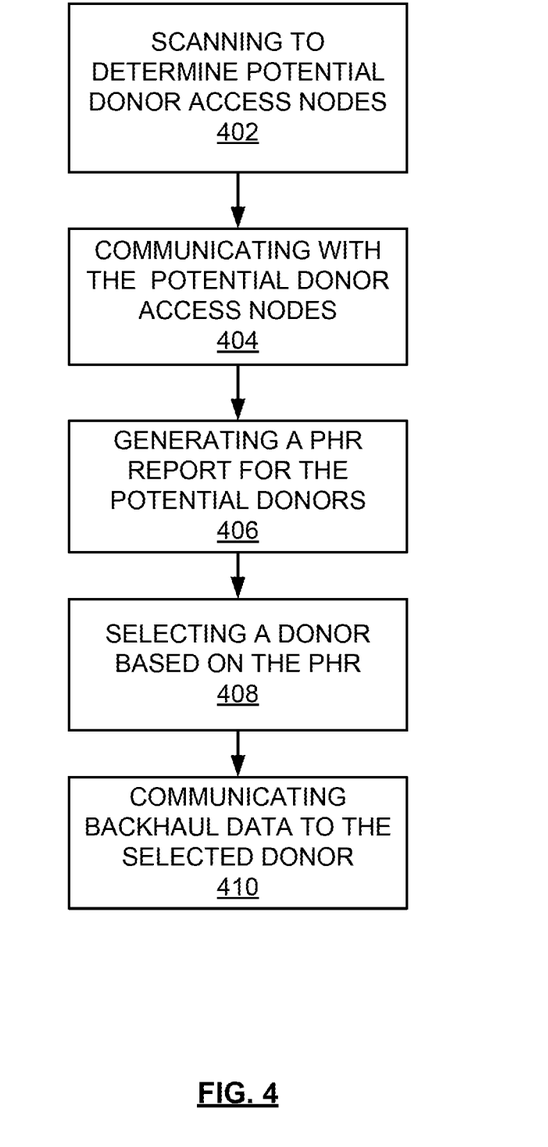
FIG. 4 depicts an exemplary method for selecting a donor for a relay wireless device based on feedback.

FIG. 4 illustrates an exemplary method for selecting a donor for a relay wireless device based on feedback according to an embodiment. The method will be discussed with reference to the exemplary communication system 100 illustrated in FIG. 1, however, the method can be implemented with any suitable communication system.

Referring to FIG. 4, at step 402, a relay wireless device may scan for signals received to determine potential donor access nodes. For example, scanning may be performed at relay wireless device 130 to determine potential donor access nodes, such as access node 110 and 112. The potential access nodes may be identified based on a received signal level at relay wireless device 130 (e.g., reference or pilot signals) received from the potential access nodes during the scanning.

At step 404, the relay wireless device may communicate with each potential donor access node such that a power head room report is generated for each potential donor access node. For example, relay wireless device 130 may attach (e.g., perform a handover) to the potential donor access nodes, such as access nodes 110 and 112. During the communication, relay wireless device 130 may generate a power head room report for the communication with each potential donor access node.

At step 406, a donor access node may be selected from among the potential donor access nodes based on the generated power head room reports. For example, relay wireless device 130 may select a donor access node based on the power head room reports generated when the relay wireless device communicated with each potential relay wireless device.

At step 408, backhaul data may be communicated between the relay wireless device and the selected donor access node. For example, relay wireless device 130 may select access node 110, and relay wireless device 130 may connect to access node 110 (e.g., via a handover) or may stay connected to access node 110. In an embodiment, backhaul data (e.g., for small cell 132) may be communicated between relay wireless device 130 and access node 110.

Figure 5:
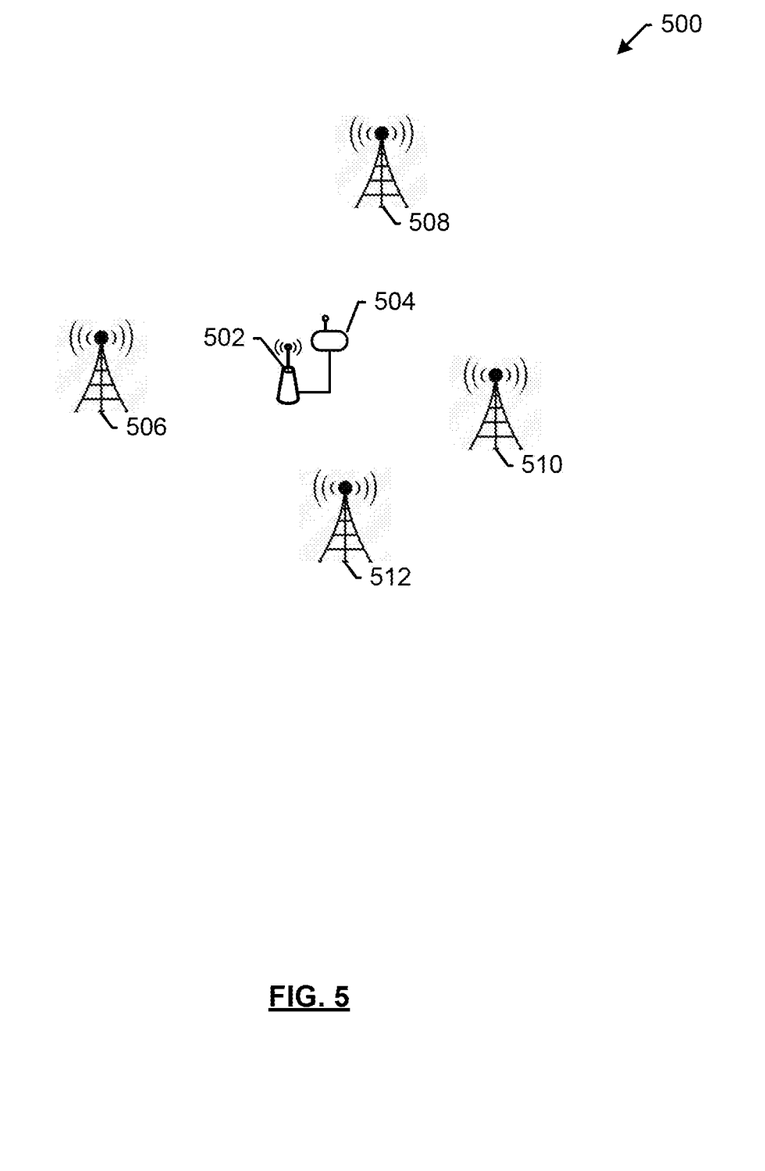
FIG. 5 depicts another exemplary system for selecting a donor for a relay wireless device based on feedback.

FIG. 5 depicts an exemplary system 500 for selecting a donor for a relay wireless device based on feedback. System 500 comprises small cell 502, relay wireless device 504, access nodes 506, 508, 510, and 512. Access nodes 506, 508, 510, and 512 may be similar to access nodes 110 and 112 of FIG. 1. Similarly, small cell 502 may be similar to small cells 131 and 133 of FIG. 1 and relay wireless device 504 may be similar to relay wireless devices 130 and 132 of FIG. 1. In an embodiment, access nodes 506, 508, 510, and 512, and small cell 504 may service a plurality of (end-user) wireless devices (not depicted).

In an embodiment, system 500 may use a plurality of carriers in order to provide wireless communication services. For example, a plurality of carriers that comprise bandwidth for wireless communications (e.g., one or more carriers over a 1.25 GHz spectrum, one or more carriers over a 1900 Mhz spectrum, one or more carriers over a 800 Mhz spectrum, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In some embodiments, relay wireless devices may overlap with coverage areas of access nodes, such as relay wireless device 504 overlapping with coverage areas for access nodes 506, 508, 510, and 512. Accordingly relay wireless device 504 may have a plurality of options when selecting a donor access node, for example to carry backhaul data between small cell 502 and a core network. In this example, the quality for communication between relay wireless device 504 and the selected donor access node can impact quality of service for end-user wireless devices serviced by small cell 502. In some embodiment, uplink communication between relay wireless device 504 and the selected donor access node may impact such quality of service at least because wireless backhaul communication may include uplink control information that relies on a reliable and/or quality uplink channel between the relay wireless devices and its donor access node. Accordingly, donor selection that considers the uplink channel between a relay wireless device and its potential donor access node may provide benefits to users of the system.

Figure 6:
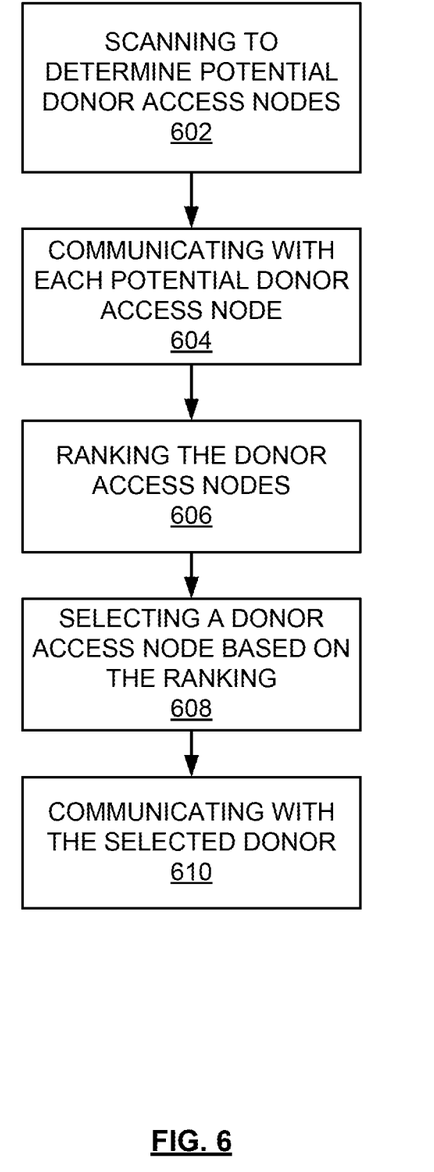
FIG. 6 depicts another exemplary method for selecting a donor for a relay wireless device based on feedback.

FIG. 6 illustrates an exemplary method for selecting a donor for a relay wireless device based on feedback according to an embodiment. The method will be discussed with reference to the exemplary communication system 500 illustrated in FIG. 5, however, the method can be implemented with any suitable communication system.

Referring to FIG. 6, at step 602, a relay wireless device may scan for signals received to determine potential donor access nodes. For example, scanning may be performed at relay wireless device 504 to determine potential donor access nodes, such as access node 506, 508, 510, and 512. The potential donor access nodes may be identified based on a received signal level at relay wireless device 504 received from the potential donor access nodes during the scanning.

In an embodiment, the performed scanning may include measuring a received signal level from each potential donor access node to determine a list of potential donor access nodes. For example, scanning signals received at relay wireless device 504 to determine potential donor access nodes may comprise measuring a received signal level from each potential donor access node to determine a list of potential donor access nodes. In an embodiment, the list may comprise potential donor access nodes that are associated with a measured received signal level (e.g., SINR, RSRP, and the like) greater than a threshold (e.g., SINR threshold, RSRP threshold, and the like).

In an embodiment, the signal received from the potential donor access nodes at relay wireless device 504 may comprise a reference or pilot signal. For example, the potential donor access nodes that comprise the determined list meet a criteria such that a measured signal level (e.g., RSRP) received at relay wireless device 504 from each potential donor access nodes that comprises the list is greater than a threshold (e.g., RSRP threshold).

In an embodiment, signals received from access nodes 506, 508, and 512 at relay wireless device 504 may meet the criteria, and thus access nodes 506, 508, and 512 may comprise the list of potential donor access nodes. A signal received from access nodes 510 at relay wireless device 504 may not meet the criteria, and thus access node 510 may not be on the list of potential donor access nodes for relay wireless device 504.

In an embodiment, the scanning may be performed by relay wireless device 504 a plurality of times. For example, the scanning may comprise a period (e.g., minutes, hours, days, and the like) such that the scanning is repeated and the results of the scan (e.g., list of potential donor access nodes) is updated based on the period.

At step 604, the relay wireless device may communicate with each potential donor access node such that a power head room report is generated for each potential donor access node. For example, relay wireless device 504 may attach to each potential donor access node, such as access nodes 506, 508, and 512, and generate a power head room report. This report generation may be part of a RRC connection setup for relay wireless device 504 with each potential donor. In some examples, relay wireless device 502 detaches from a given potential donor before attaching to the next potential donor and generating a power head room report.

In an embodiment, a power head room report that may include a transmission power headroom for a wireless device may be generated when relay wireless device 504 is in communication with each potential donor access node. When communicating with a potential donor access node, such as access node 506, relay wireless device 504 may receive control instructions, feedback, and other information such that a transmit power is determined for the relay wireless device for its communication with the access node. In an embodiment, relay wireless device 504 may generate a headroom report for its communication with access node 506 that comprises the difference between the current transmit power a transmission from the wireless device (e.g., the transmission used to transmit the headroom report) and a maximum uplink transmit power.

In an embodiment, the headroom report may comprise a value that corresponds to a power level difference between a current transmission power for the wireless device and the maximum transmission power for the wireless device (e.g., measured in dB). For example, the maximum uplink transmit power for a wireless device may be established by a network administrator, a standard used for communication (e.g., LTE), a local regulation, or in any other manner. In an embodiment, the maximum transmission power for wireless device 304 may include one or more adjustments based on a permitted maximum power adjustment (MPR) or addition maximum power adjustment (A-MPR). For instance, local regulations (e.g., country regulations) may include certain requirements for out of band emissions (OOBE) such that a network operator or wireless device does not interfere with other wireless resources (e.g., licensed by other organizations or operators). In an embodiment, a spectral emissions mask may be applied by the wireless device in order to meet such regulations. Accordingly, based on conditions for wireless device 304, one or more of MPR or A-MPR may be applied to a maximum transmission power, effectively lowering the uplink maximum transmission power for the wireless device. Any MPR or A-MPR applied to the maximum power of a transmission may be accounted for when reporting the current power headroom in the headroom report (e.g., any reduction may be represented by the value generated in the head room report).

At step 608, the potential donor access nodes may be ranked. For example, a list of potential donor access nodes may be determined (e.g., 506, 508, and 512) and the list may be ranked based on the head room report generated by relay wireless device 504 when in communication with each of the potential donor access nodes that comprise the list. The method of FIG. 7 further describes embodiments for ranking the potential donor access nodes.

At step 606, a donor access node may be selected from among the potential donor access nodes based on the ranking. For example, selecting the donor access node may be based on one or more of the power head room report from the potential donor access nodes, the determined path loss for the potential donor access nodes, the remaining power head room for the potential donor access nodes, and a determined trend in power head room for one or more of the potential donor access nodes. In an embodiment, the list of potential donor access nodes (e.g., access nodes 506, 508, and 512) may be ranked according to embodiments described with reference to FIG. 7, and the selection may be based on the ranking.

In an embodiment, selecting the donor access node may be based on the ranking for the list of potential donor access nodes and a monitored load for the ranked potential access nodes. For examples, access nodes 506, 508, and 512 may be ranked according to a first ranking, and where the loads on the access nodes falls ball a load criteria, the highest ranked access node may be selected as the donor access node. In another example, where a load for the highest ranked access node meets or exceeds the load criteria, the second highest ranked access node may be selected. In other words, a potential donor access node may be selected for relay wireless device 504 according to the ranking, however when a load for a potential donor access node meets or exceeds the load criteria, the access node may be skipped in the ranking.

In an embodiment, load at the potential donor access nodes may be based on one or more of resource block utilization for the access node, number of connections to wireless devices (e.g., RRC connections), memory utilization, a processor utilization, and any other suitable metric. The load criteria may comprise one or more of a threshold for resource block utilization threshold, a threshold number of connections to wireless devices, a memory utilization threshold, a processor utilization threshold, and any other suitable threshold.

At step 614, backhaul data may be communicated between the relay wireless device and the selected donor access node. For example, relay wireless device 504 may select access node 506, and relay wireless device 504 may connect to access node 506 (e.g., via a handover) or may stay connected to access node 506. In an embodiment, backhaul data (e.g., for small cell 502) may be communicated between relay wireless device 504 and access node 506 (e.g., the selected donor access node) to service end-user wireless devices.

Figure 7:
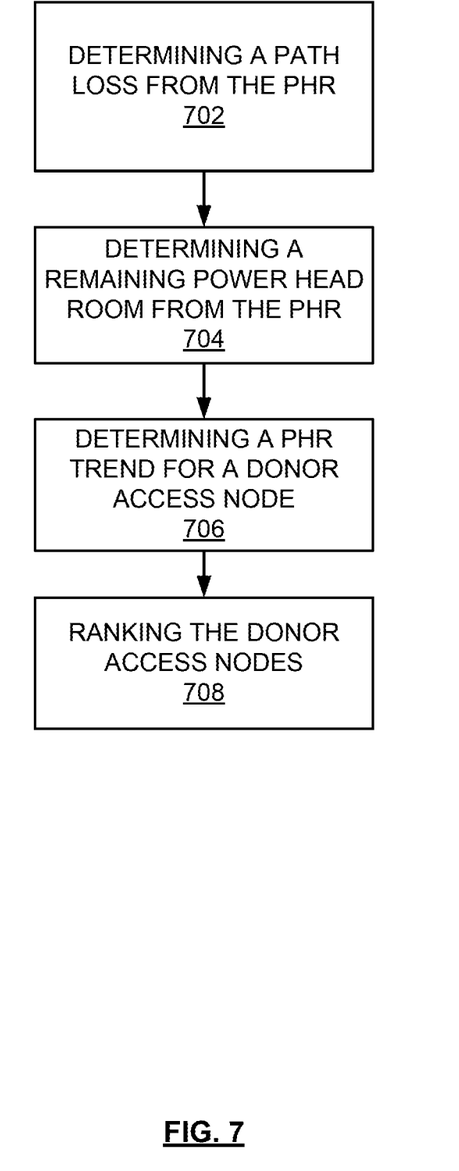
FIG. 7 depicts an exemplary method for ranking donors for a relay wireless device based on feedback.

FIG. 7 illustrates an exemplary method for ranking potential donor access nodes for a relay wireless device based on feedback according to an embodiment. The method will be discussed with reference to the exemplary communication system 500 illustrated in FIG. 5, however, the method can be implemented with any suitable communication system. In an embodiment, the ranking determined may be implemented with various embodiments disclosed by the method of FIG. 6. For example, the ranking may be implemented at step 608 of FIG. 6

Referring to FIG. 7, at step 702, a path loss may be determined from each generated power head room report. For example, relay wireless device 504 may determine a path loss based on the generated power head room reports for communication with each potential donor access node. In an embodiment, the potential donor access nodes may comprise a list of potential donor access nodes (e.g., access nodes 506, 508, and 512) according to signals received at relay wireless device 504, as determined at step 602 of FIG. 6.

In an embodiment, the power head room report generated relative to communication with each potential donor access node from among the list may comprise path loss data for communication with the respective potential donor access node. For example, relay wireless device 504 can calculate the path loss for communication with each donor access node based on a difference between the reference or pilot signal transmission power provided to the wireless device by the respective access node and the measured reference or pilot signal level received at relay wireless device 504 (e.g. RSRP).

At step 704, a remaining power head room may be determined from each received power head room report. For example, relay wireless device 504 may determine a remaining power head room for the generated power head room reports for communication with each potential donor access node. In an embodiment, the generated power head room reports may comprise a reported power head room value (e.g., 0-63) and the reported value may indicate a power head room range (e.g., in dBs).

At step 706, a trend in power head room remaining may be determined for the relay wireless device based on the generated power head room reports relative to one or more of the potential donor access nodes. For example, relay wireless device 504 may determine a remaining power head room for the generated power head room reports for communication with each potential donor access node, where the determining may repeat according to a predetermined period (e.g., minutes, hours, days, and the like). In an embodiment, the generated power head room reports may comprise a reported power head room value (e.g., 0-63) and the reported value may indicate a power head room range (e.g., in dBs), and a number of previous power head room values generated for communication for a given potential donor access node may be stored (e.g., over the last 3 repeated periods, 4 repeated periods, and the like). Based on the stored power head room values, a trend may be determined.

In an embodiment, a plurality of power head room values for communication between relay wireless device 504 and access node 512 may be stored according to various embodiments. When at least two of the power head room values meet or exceed a trend criteria, it may be determined that access node 512 should be excluded from the ranking. When these power head room values meet or exceed the trend criteria, it may indicate that a quality for the uplink channel between relay wireless device 504 and access node 512 is below a threshold to effectively support backhaul communication. For example, when two or more power head room values are less than or equal to the head room metric 23 (e.g., corresponding to 0 dB), the access node associated with the power head room values (e.g., access node 512) can be excluded from the ranking.

At step 708, a ranking for the list of potential donor access nodes may be determined. For example, the list of potential donor access nodes may be ranked based on one or more of the determined path loss for the potential donor access nodes, the determined a power head room remaining for the relay wireless device relative to each potential donor access node, and the determined trend in power head room remaining for the relay wireless device relative to one or more potential donor access node.

In an embodiment, a low value for path lass (e.g., below a path loss threshold) may increase a potential donor access node's ranking. Similarly, a power head room value that indicates a substantial amount of transmit power (e.g., power head room above a power head room threshold) available for relay wireless device 504 may increase a potential donor access node's ranking. In other words, a ranking for a potential donor access node may be inversely related to the path loss value for the potential donor access node and directly related to the power head room value (e.g., amount of transmit power available for the relay wireless device) for communication between relay wireless device 504 and the potential donor access node. As discussed with reference to step 706, a potential donor access node may be excluded from the ranking based on a trend for remaining power head room determined for the potential donor access node. In an embodiment, access nodes 506, 508, and 512 (e.g., the list of potential donor access nodes for relay wireless device 504) may be ranked according to the embodiments described herein.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access nodes 110, 310, relay wireless devices 130, 230, gateway nodes 102, and/or network 101.

Figure 8:
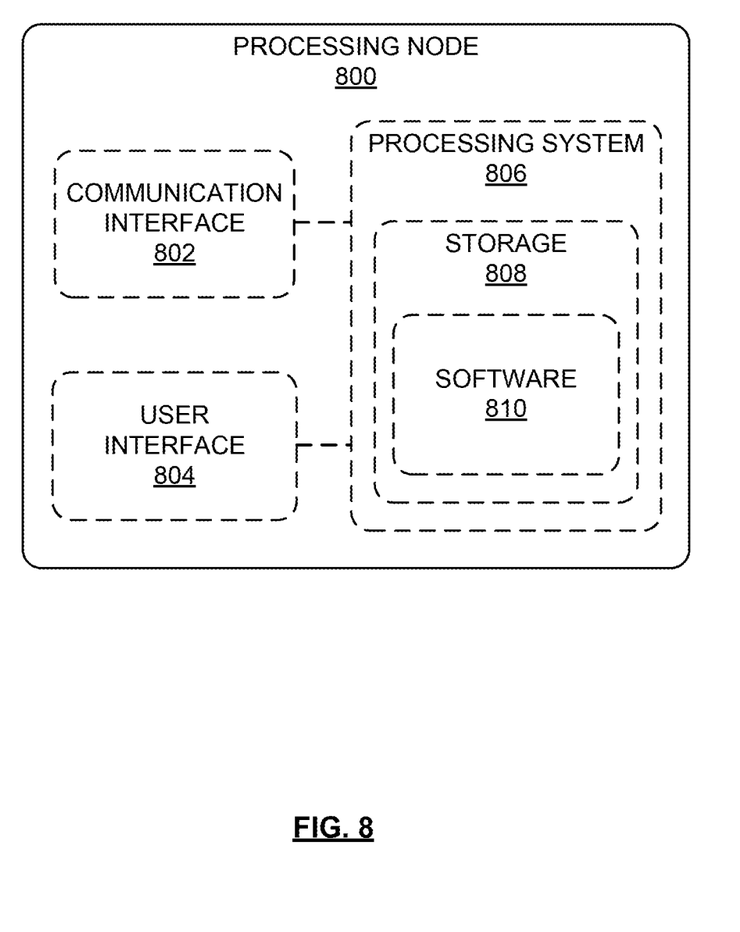
FIG. 8 depicts an exemplary processing node.

FIG. 8 depicts an exemplary processing node 800 comprising communication interface 802, user interface 804, and processing system 806 in communication with communication interface 802 and user interface 804. Processing system 806 includes storage 808, which can comprise a disk drive, flash drive, memory circuitry, or other memory device. Storage 808 can store software 810 which is used in the operation of the processing node 800. Storage 808 may include a disk drive, flash drive, data storage circuitry, or some other memory apparatus. Software 810 may include computer programs, firmware, or some other form of machine-readable instructions, including an operating system, utilities, drivers, network interfaces, applications, or some other type of software. For example, software 810 may include modules for performing the operations described with reference to FIGS. 4, 6, and 7. Processing system 806 may include a microprocessor and other circuitry to retrieve and execute software 810 from storage 808. Processing node 800 may further include other components such as a power management unit, a control interface unit, etc., which are omitted for clarity. Communication interface 802 permits processing node 800 to communicate with other network elements. User interface 804 permits the configuration and control of the operation of processing node 800.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for selecting a donor for a relay wireless device using feedback, the method comprising:
scanning for signals received at a relay wireless device to determine potential donor access nodes;
communicating with the potential donor access nodes such that a power head room report is generated for each potential donor access node;
ranking the potential donor access nodes based on the generated power head room reports;
selecting a donor access node from among the potential donor access nodes based on the ranking; and
communicating backhaul data for one or more wireless devices between the relay wireless device with the selected donor access node.

2. The method of claim 1,
wherein the selecting is further based on a monitored load for the ranked potential donor access nodes.

3. The method of claim 1, further comprising:
determining a path loss for the potential donor access nodes based on the power head room reports;
wherein ranking the potential donor access nodes is further based on the determined path loss for the potential donor access nodes.

4. The method of claim 1, further comprising:
determining a path loss for the potential donor access nodes based on the power head room reports; and
determining a power head room remaining for the relay wireless device based on the generated power head room report relative to each potential donor access node;
wherein the raking is further based on the determined path loss for the potential donor access nodes and the determined power head room remaining for the relay wireless device relative to each potential donor access node.

5. The method of claim 1, further comprising:
determining a path loss for the potential donor access nodes based on the power head room reports;
determining a power head room remaining for the relay wireless device based on the generated power head room report relative to each potential donor access node; and
determining a trend in power head room remaining for the relay wireless device based on the generated power head room reports relative to one or more of the potential donor access nodes;
wherein the ranking is further based on the determined path loss for the potential donor access nodes, the determined power head room remaining for the relay wireless device relative to each potential donor access node, and the determined trend in power head room remaining for the relay wireless device relative to one or more potential donor access node.

6. The method of claim 5, further comprising:
excluding at least one potential donor access node from the ranking based on the determined trend in power head room remaining for the relay wireless device relative to the one potential donor access node.

7. The method of claim 6, wherein excluding the one potential donor access node from the ranking comprises comparing multiple head room power values generated for communication with the one potential donor access node to a trend criteria and excluding the one potential donor access node when two or more of the multiple power head room values meet the trend criteria.

8. The method of claim 1, wherein scanning signals received at a relay wireless device to determine potential donor access nodes further comprises measuring a received signal level from each potential donor access node to determine a list of potential donor access nodes.

9. The method of claim 8, wherein the potential donor access nodes that comprise the determined list meet a criteria such that a measured signal level received at the relay wireless device from each potential donor access nodes that comprises the list is greater than a threshold.

10. A system for selecting a donor for a relay wireless device using feedback, the system comprising:
   a relay wireless device comprising:
      a wireless interface for communicating with donor access nodes; and
      a processor configured to:
         scan for signals received at a relay wireless device to determine potential donor access nodes;
         communicate with the potential donor access nodes such that a power head room report is generated for each potential donor access node;
         rank the potential donor access nodes based on the generated power head room reports;
         select a donor access node from among the potential donor access nodes based on the ranking; and
         communicate backhaul data for one or more wireless devices between the relay wireless device with the selected donor access node.

11. The system of claim 10, wherein the relay wireless device is further configured to:
   select a donor access node from among the potential donor access nodes for the relay wireless device based on a monitored load for the ranked potential donor access nodes.

12. The system of claim 10, wherein the relay wireless device is further configured to:
   determine a path loss for the potential donor access nodes based on the power head room reports; and
   rank the potential donor access nodes further based on the determined path loss for the potential donor access nodes.

13. The system of claim 10, wherein the relay wireless device is further configured to:
   determine a path loss for the potential donor access nodes based on the power head room reports;
   determine a power head room remaining for the relay wireless device based on the generated power head room report relative to each potential donor access node; and
   rank the potential donor access nodes further based on the determined path loss for the potential donor access nodes and the determined power head room remaining for the relay wireless device relative to each potential donor access node.

14. The system of claim 10, wherein the relay wireless device is further configured to:
   determine a path loss for the potential donor access nodes based on the power head room reports;
   determine a power head room remaining for the relay wireless device based on the generated power head room report relative to each potential donor access node;
   determine a trend in power head room remaining for the relay wireless device based on the generated power head room reports relative to one or more of the potential donor access nodes; and
   rank the potential donor access nodes further based on the determined path loss for the potential donor access nodes, the determined power head room remaining for the relay wireless device relative to each donor access node, and the determined trend in power head room remaining for the relay wireless device relative to one or more potential donor access node.

15. The system of claim 14, wherein the relay wireless device is further configured to:
   exclude at least one potential donor access node from the ranking based on the determined trend in power head room remaining for the relay wireless device relative to the one potential donor access node.

16. The system of claim 15, wherein excluding the one potential donor access node from the ranking comprises comparing multiple head room power values generated for communication with the one potential donor access node to a trend criteria and excluding the one potential donor access node when two or more of the multiple power head room values meet the trend criteria.

17. The system of claim 10, wherein scanning signals received at a relay wireless device to determine potential donor access nodes further comprises measuring a received signal level from each potential donor access node to determine a list of potential donor access nodes.

18. The system of claim 17, wherein the potential donor access nodes that comprise the determined list meet a criteria such that a measured signal level received at the relay wireless device from each potential donor access nodes that comprises the list is greater than a threshold.

* * * * *